United States Patent [19]
Loy et al.

[11] Patent Number: 5,639,371
[45] Date of Patent: Jun. 17, 1997

[54] AERATION REACTOR WITH FLOW CONTROL

[75] Inventors: Daniel E. Loy, Boca Raton; Michael H. Jakob, Delray Beach, both of Fla.

[73] Assignee: Parkson Corporation, Ft. Lauderdale, Fla.

[21] Appl. No.: 629,556

[22] Filed: Apr. 9, 1996

[51] Int. Cl.$^6$ ................................................ C02F 3/12
[52] U.S. Cl. .......................... 210/614; 210/624; 210/626; 210/87; 210/104; 210/195.3
[58] Field of Search ........................... 210/607, 614, 210/621, 624, 626, 195.1, 193.3, 104, 87, 257.1, 259

[56] References Cited

U.S. PATENT DOCUMENTS

| | | |
|---|---|---|
| 2,580,764 | 1/1952 | Gunz . |
| 3,403,095 | 9/1968 | Chipperfield et al. . |
| 3,549,521 | 12/1970 | Stevens . |
| 3,596,767 | 8/1971 | Antonie ........................... 210/195.3 |
| 3,623,976 | 11/1971 | Cessna ............................ 210/195.3 |
| 4,303,527 | 12/1981 | Reimann et al. ................. 210/614 |
| 4,308,150 | 12/1981 | Miynoka et al. ................. 210/614 |
| 4,940,544 | 7/1990 | Gode et al. ..................... 210/621 |
| 5,011,605 | 4/1991 | Pape et al. ..................... 210/195.1 |
| 5,021,161 | 6/1991 | Callthrap ........................ 210/614 |
| 5,205,936 | 4/1993 | Topnik .......................... 210/614 |
| 5,228,996 | 7/1993 | Lansdell ......................... 210/624 |
| 5,554,289 | 9/1996 | Grounds ......................... 210/195.3 |

FOREIGN PATENT DOCUMENTS 3637476  5/1988  Germany .

*Primary Examiner*—Christopher Upton
*Attorney, Agent, or Firm*—Brumbaugh, Graves, Donohue & Raymond

[57] ABSTRACT

In the aeration reactor described in the specification, an aeration basin has two aeration cells separated by a dividing curtain and connected in series so as to normally receive wastewater in the first aeration cell and then pass the wastewater to the second aeration cell which is followed by a clarifier to separate sludge from the treated wastewater. A liquid level detector in the reactor responds to surges in the rate of flow of the wastewater through the reactor to redirect incoming wastewater and return sludge from the first aeration cell into the second aeration cell and isolate the first aeration cell to preserve active sludge in that cell.

13 Claims, 1 Drawing Sheet

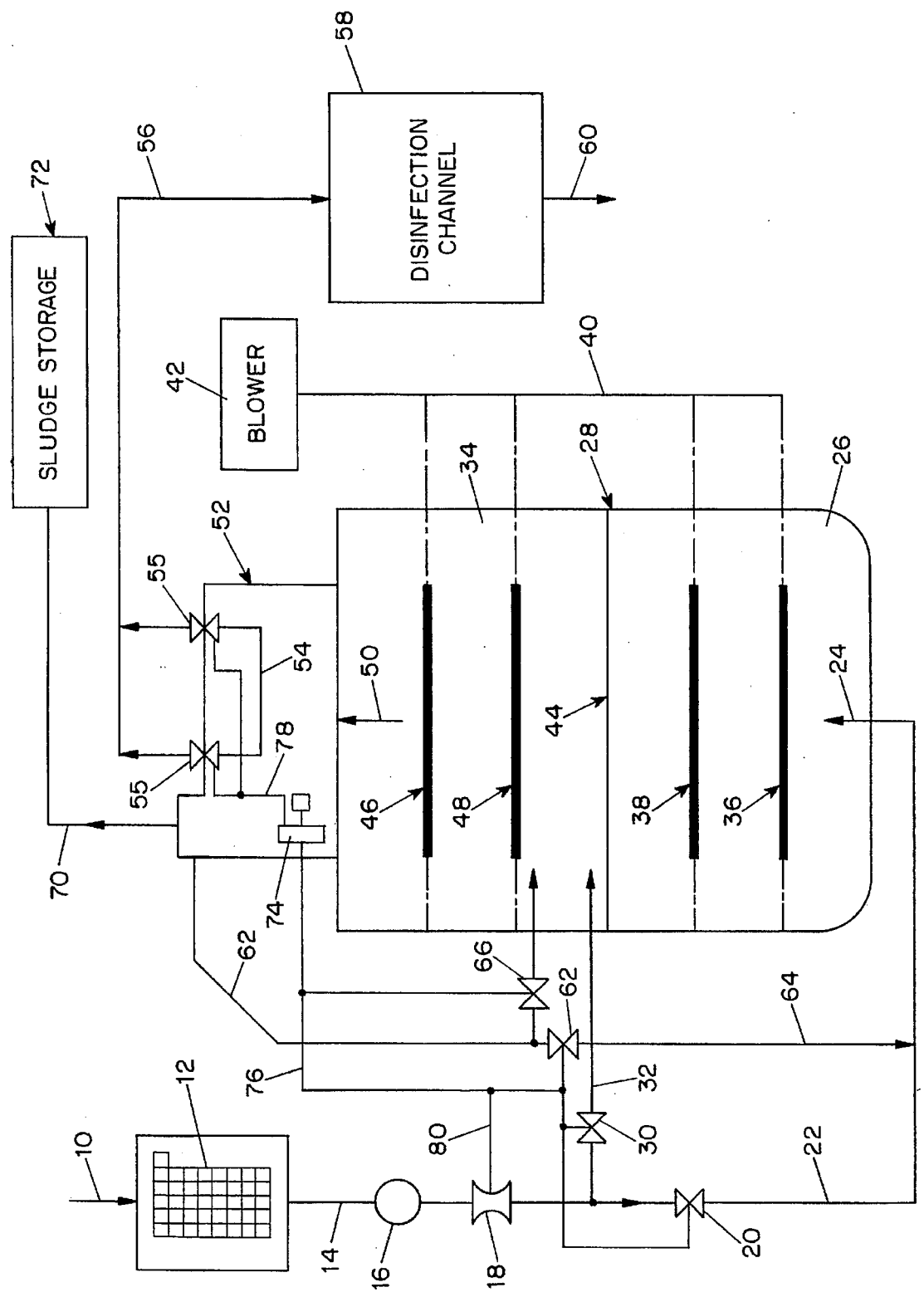

AERATION REACTOR WITH FLOW CONTROL

BACKGROUND OF THE INVENTION

This invention relates to aeration systems for aerating wastewater streams which are subject to varying flow rates.

In certain wastewater treatment systems, a stream of wastewater is subjected to biological treatment in an aeration basin containing active sludge followed by clarification in a clarifier. In many cases, the rate of flow of the wastewater entering the basin is subject to large variations resulting, for example, from sudden storms producing a surge of rain water into the sewer system from which the wastewater stream is supplied to the aeration basin. In such cases, the surge of wastewater passing through the aeration basin may carry away much or all of the active sludge or "biomass" in the aeration basin and in the clarifier, causing a substantial delay in restoration of biomass to the system to permit normal operation.

To counteract this effect, the Stevens U.S. Pat. No. 3,549,521 discloses a two-stage treatment system with an aerator and a clarifier in each stage and having valves arranged to connect the two stages either in series or in parallel. As long as the incoming wastewater flow rate is below a predetermined level, all of the wastewater to be treated passes through both stages in series, but when the flow rate exceeds a selected level, a portion of the incoming wastewater is diverted directly to the second stage and the outlet from the first stage is diverted to the output from the system. In each stage sludge is returned from the clarifier to the input for that stage or is supplied to a digester. This arrangement, however, does not avoid the problem of loss of biomass from both treatment stages in the event of prolonged surges.

The Chipperfield et al. U.S. Pat. No. 3,403,095 discloses a wastewater treatment system having a first biological treatment filter supplying treated wastewater to a primary clarifier from which the effluent passes to a secondary treatment stage and then to a final clarifier during normal operation. When rainfall causes a surge resulting in a flow rate exceeding the capacity of the primary clarifier, a portion of the output from the first biological treatment stage is bypassed to the final clarifier, thereby eliminating the primary clarifier and secondary treatment for that portion and the portion which passes through the primary clarifier and the secondary treatment stage may bypass the final clarifier. This arrangement also does not avoid the problem of loss of active sludge from both stages during extended periods of excessive slow rates through the system.

U.S. Pat. No. 3,623,976 to Cessna discloses a wastewater treatment system which includes a primary clarifier, a biological filter and a secondary clarifier which are normally connected in series. In order to avoid loss of solids from the system during high loading, a bypass is provided to divert incoming liquids around the primary clarifier and the biological filter then functions as a trickling filter, which inhibits loss of active solids. This arrangement, however, requires a biological filter construction which can act as a trickling filter under such conditions.

SUMMARY OF THE INVENTION

Accordingly, it is an object of the present invention to provide an improved aeration reactor which overcomes the above-mentioned disadvantages of the prior art.

Another object of the invention is to provide an aeration reactor with flow control which responds to increased flow rates to preserve biomass within the aeration reactor.

These and other objects of the invention are attained by providing an aeration basin having two aeration cells separated by a divider provided with openings permitting flow from the first aeration cell to the second aeration cell and a clarifier which receives the output of the second aeration cell. In accordance with one aspect of the invention, a flow control method is provided which includes directing the incoming wastewater to the first aeration cell when the wastewater flow rate is below a selected value and directing the incoming wastewater to the second aeration cell when the wastewater flow rate exceeds a selected level, thereby bypassing the first aeration cell and preserving active solids therein during surges in the rate of incoming wastewater. In a preferred embodiment, sludge removed from the clarifier is normally returned to the first aeration cell, but in response to detection of an increase in the liquid level in the clarifier, sludge removed from the clarifier is directed to the second aeration cell to facilitate treatment of the wastewater passing therethrough without drawing upon the active sludge in the first aeration cell.

In accordance with another aspect of the invention, an aeration reactor with flow control is provided in which the wastewater intake is connected to both the first and second aeration cells by lines having valves which are selectively operable in response to a determination of flow rates to cause the wastewater to be directed to the first aerator cell at a low flow rate and to the second aerator cell at a high flow rate. In addition, a sludge return line from the clarifier is similarly connected to both the first and second aeration cells by lines having valves which have selectively actuated in response to determination of low and high wastewater flow rates. Preferably, the wastewater flow rate is detected by a liquid level detector disposed in the reactor, and, in one embodiment the liquid level detector is in the clarifier. If desired, an additional sludge storage basin may be provided for storing excess sludge withdrawn from the clarifier.

BRIEF DESCRIPTION OF THE DRAWING

Further objects and advantages of the invention will be apparent from the reading of the following description in conjunction with the accompanying drawing, which is a schematic flow diagram illustrating the arrangement of a representative embodiment of an aeration reactor having flow control in accordance with the invention.

DESCRIPTION OF PREFERRED EMBODIMENTS

In the representative embodiment of an aeration reactor arrangement illustrated in the accompanying drawing, wastewater to be treated is received at an intake 10 to a bar screen or filter 12 which removes relatively large solid objects in a conventional manner and passes through a line 14 to a grit removal station 16 where sand and grit are removed. After passing through a flow measurement station 18, the incoming wastewater is normally directed through an open valve 20 into a line 22 leading to an inlet 24 to a first aeration cell 26 in an aeration basin 28. Normally, a valve 30 in a line 32 leading to a second aeration cell 34 in the basin 28 is closed, thereby requiring all of the wastewater to be supplied to the first aeration cell inlet 24.

The wastewater within the first aeration cell 26 is aerated, for example, by two moving aeration chains 36 and 38 which may be of the type described in the von Nordenskjold U.S. Pat. No. 4,287,062, the disclosure of which is incorporated herein by reference. As there described, each of the chains 36 and 38 is buoyantly supported on the surface of the liquid in the cell and a series of aerators (not shown) suspended from the chains 36 and 38 are disposed near the bottom of the cell and receive air under pressure from a line 40 connected to a blower 42. As described in U.S. Pat. No. 4,287,062, the supply of air to the suspended aerators causes the lines 36 and 38 to oscillate within the aeration cell 26, aerating the wastewater and stirring up sludge which has collected on the bottom of the cell to assure thorough biological treatment of the wastewater passing through the cell.

The second aeration cell 34 is separated from the cell 26 by a curtain divider 44 having window flaps which permit wastewater to flow from the cell 26 into the cell 34, but inhibit flow in the opposite direction. The cell 34 is similarly provided with aeration chains 46 and 48 which are supplied with air under pressure from the line 40 and operate in the manner described with respect to the aeration chains 36 and 38 in the cell 26. In this way the aeration cells 26 and 34 are connected in series during normal operation of the aeration reactor.

Following sequential treatment in the first and second aeration cells 26 and 34, the wastewater passes through an outlet 50 into a clarifier 52 where the solid material in the wastewater is separated by settling from the liquid and the supernatant liquid then passes over a floating weir 54 within the clarifier and then through two adjustable clarifier outlet valves 55 to an effluent line 56 leading to a disinfection channel 58 from which purified wastewater passes to an outlet line 60. The size of the openings in the outlet valves 55 is controllable, thereby permitting control of the rate of flow of wastewater which can pass through the system without causing the level of liquid in the clarifier to rise and also permitting liquid to be discharged from the system at the necessary rate during surges.

Sludge collected at the bottom of the clarifier 52 is returned to the aeration basin through a line 62 and in normal operation a valve 64 is kept open to convey the sludge to a line 66 leading to the intake line 22 which supplies the inlet 24 for the first aeration cell 26. Another valve 68, which connects the sludge return to the second aeration cell is normally maintained in the closed condition. Excess sludge from the clarifier 50 may be passed, if desired, through a line 70 to a storage basin 72.

In accordance with the invention, when the flow rate of the incoming wastewater to be treated exceeds a selected level, the first aeration cell 26 is isolated and all of the incoming wastewater is directed into the second aeration cell 34 to preserve the biomass in the first aeration cell until the surge in flow rate has terminated. In one embodiment, this change is effected by providing a liquid level detector 74 in the clarifier 50 which responds to detection of a liquid level in the aeration reactor which is greater than a selected value, indicating a surge in the wastewater flow rate, to supply signals on a line 76 to close the valve 20 and open the valve 30 to direct the incoming wastewater through the line 32 into the second aeration cell 34 and to close the valve 62 and open the valve 66 to direct sludge returned from the clarifier into the second aeration cell 34 rather than to the first cell 26. In an alternative embodiment, the floating weir 54 and the adjustable outlet valves 55 replace the outlet 50 to the clarifier at the end of the aeration zone and the liquid level detector 74 is disposed with the second aeration cell 34. With this arrangement, the clarifier can be separated from the aeration basin. Moreover, when the liquid level in the aeration reactor reaches an upper limit, the liquid level detector supplies signals on a line 78 to open the outlet valves 55 to increase the rate of flow from the reactor.

In this way, the active sludge in the cell 26 is preserved during the surge and all of the returned sludge from the clarifier goes directly into the cell 34 to facilitate treatment of the incoming stream of wastewater. Preferably, the aeration lines 36 and 38 in the first aeration cell 26 continue to operate while the cell is isolated, thereby maintaining the sludge in circulation in the cell so as to be ready for reactivation of the cell upon completion of the surge. Alternatively, however, the air line 40 could be disconnected from the aeration lines 36 and 38 when the cell 26 is not at operation.

As described above, since the clarifier outlet valves 55 are adjustable, the flow rate which causes a rise in the level in the clarifier can be controlled to determine the wastewater flow rate at which the level detector 74 will be activated to change the valves 20, 30, 62 and 66. Consequently, the clarifier outlet valves can be set to a desired setting based on the flow rate which will cause a loss of biomass.

Instead of utilizing a level detector 74 in the clarifier 50 or in the aeration cell 34 and supplying signals therefrom on the line 76 to control the valves 20, 30, 62 and 66, those valves could be controlled, if desired, from the flow measurement device 18 by supplying signals on a line 80 to the valves in the manner described above.

Although the invention has been described herein with reference to specific embodiments, many modifications and variations therein will readily occur to those skilled in the art. For example, the aeration reactor could include three or more aeration cells normally connected in series and the first one or two of those cells could be isolated during a surge condition. Accordingly, all such variations and modifications are included within the intended scope of the invention.

We claim:

1. A process for treating wastewater in an aeration reactor comprising normally passing wastewater to be treated through a first aeration cell containing active sludge and aerating the wastewater therein to treat waste material carried by the wastewater, passing the wastewater from the first aeration cell to a second aeration cell, aerating the wastewater in the second aeration cell to further treat the waste material carried by the wastewater, passing the wastewater into a clarifier and permitting solid material carried by the wastewater to settle in the clarifier and discharging supernatant liquid from the clarifier to an outlet, detecting a change in the flow rate of wastewater through the aeration reactor, isolating the first aeration cell in response to an increase in the flow rate of wastewater to a level higher than a selected level to retain active solids in the first aeration cell while directing substantially all of the wastewater to be treated into the second aeration cell until the flow rate returns to a level below the selected level.

2. A method according to claim 1 including the steps of detecting a change in the wastewater flow rate by detecting a variation in the level of liquid in the aeration reactor, and controlling valves in an intake line to direct incoming wastewater to either the first aeration cell or to the second aeration cell in accordance with the detected level of liquid in the aeration reactor.

3. A method according to claim 2 including the step of controlling an outlet from the clarifier to cause a variation in the level of liquid in the clarifier when the wastewater flow rate reaches a selected value.

4. A method according to claim 2 including the step of controlling an outlet from the second aeration cell to cause a variation in the level of liquid in that aeration cell when the wastewater flow rate reaches a selected value.

5. A method according to claim 2 including the steps of returning sludge from the clarifier through a sludge return line to the aeration basin and controlling valves in the sludge return line to direct the sludge into either the first aeration cell or the second aeration cell in accordance with the level of liquid in the clarifier.

6. A method according to claim 1 including the step of detecting the wastewater flow rate by measuring the rate of flow in an incoming wastewater line leading to the aeration basin.

7. An aeration reactor for aerating wastewater comprising an aeration basin, at least one divider for dividing the aeration basin into at least two cells normally connected in series, aeration means for aerating the wastewater in each of the aeration cells, a clarifier for receiving aerated wastewater from the aeration basin, an inlet line to supply wastewater to the aeration basin, and flow control means for controlling the flow of wastewater from the inlet line either to the first aeration cell or for isolating the first aeration cell from the subsequent aeration cell and the clarifier when the flow rate exceeds a selected level and directing flow from the inlet to a subsequent aeration cell in accordance with the rate of flow of wastewater through the aeration basin.

8. An aeration reactor in accordance with claim 7 including valved lines connecting the wastewater inlet line to the first aeration cell and to a subsequent aeration cell, respectively, and control means for controlling the valves in the valved lines in accordance with the flow rate supplied to the aeration basin.

9. An aeration reactor in accordance with claim 8 including a liquid level detector in the aeration reactor for detecting the level of liquid therein and controlling the valved lines for supplying incoming wastewater either to the first aeration cell or to a subsequent aeration cell in accordance with the level of liquid in the aeration reactor.

10. An aeration reactor in accordance with claim 9 wherein the liquid level detector is disposed in the clarifier.

11. An aeration reactor in accordance with claim 10 wherein the clarifier includes a floating weir and controllable outlet valves which are adjustable to control the wastewater flow rate at which the level of liquid in the clarifier will rise.

12. An aeration reactor in accordance with claim 7 including sludge return means for returning sludge from the clarifier to the aeration basin and valve means for controlling the return of sludge either to the first aeration cell or to a subsequent aeration cell in accordance with the rate of flow of wastewater through the aeration basin.

13. An aeration reactor in accordance with claim 7 wherein the aeration means includes at least one moving aerator chain in each of the aerator cells and a plurality of aerators suspended from the aerator chain for aerating the wastewater while maintaining circulation of active sludge.

* * * * *